Figure 1:
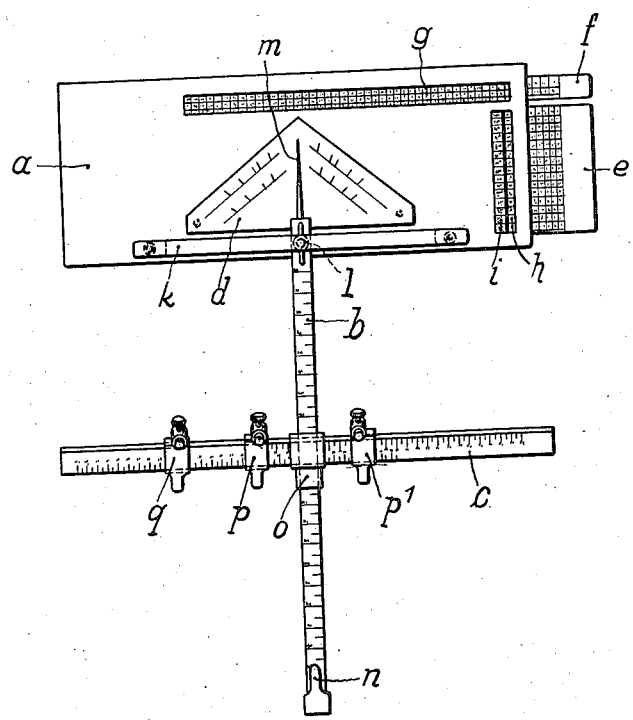

June 23, 1936. J. KAUFMANN 2,045,360
ARRANGEMENT FOR THE REGULAR FORMATION OF CHARACTERS
Filed Aug. 24, 1935

INVENTOR:
Johanna Kaufmann
ATTORNEYS:

Patented June 23, 1936

2,045,360

UNITED STATES PATENT OFFICE 2,045,360

ARRANGEMENT FOR THE REGULAR FORMATION OF CHARACTERS

Johanna Kaufmann, Mulheim-on-the-Ruhr, Germany, assignor to Irene Strauss, Mulheim-on-the-Ruhr, Germany, and Ludwig Frankenberg, Dusseldorf, Germany Application August 24, 1935, Serial No. 37,766
In Germany February 14, 1934

4 Claims. (Cl. 33—32)

An arrangement has already been proposed for facilitating the drawing of regular written characters but in this known arrangement it is necessary to employ a special composition for each style and size of writing because a continuous exchange of type, style and size is extremely inconvenient and tedious and thus uneconomical.

The object of the present invention is to avoid these disadvantages by ensuring a precise determination of size and style of the characters as well as the determination of the spacing between characters with greatest accuracy by means of two-part slide gauges which are provided.

Not only does the present device make it possible to determine all magnitudes relating to the art of writing characters with the exclusion of any expert knowledge but it is also as simple as possible and thus is extremely practical and economical.

The subject of the invention is represented in the accompanying drawing in which:

Fig. 1 shows a plan view and

Figure 2:
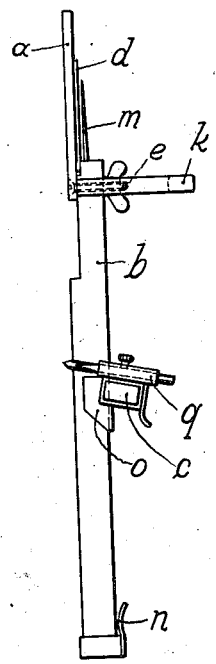

Fig. 2 a side view of one constructional form.

As seen from Fig. 1 the arrangement consists primarily of the upper head board $a$, the vertical scale $b$ and the horizontal scale $c$. Mounted on the head board $a$ is an interchangeable graduated protractor $d$ which serves for setting the direction for oblique characters. Also carried by the head board is a sliding gauge $e$ which is supplemented by a second upper sliding gauge $f$. The object of these two gauges is to indicate the correct width of the characters and the correct spacing between characters by a corresponding sliding motion. Accordingly the head board $a$ is provided with a horizontal slot $g$ and a vertical slot $h$, a vertically arranged alphabet $i$ being visible adjacent the latter. A handle $k$ detachably secured to the head board $a$ serves for holding the entire arrangement which consists of any suitable material.

The upper part of the graduated scale $b$ is secured to the head board $a$ by means of the securing screw $l$. The upper end of the scale $b$ also carries a pointer $m$ which on rocking the scale $b$ indicates the necessary slope of the characters. At the lower end of the scale $b$ is a clip $n$ on which the sliding scale $c$ is supported in its rest position.

The sliding bar $c$ which has a double scale is provided with a shoe $o$ removably sliding in the vertical direction on the scale $b$. Two drawing pencil carriers $p$, $p'$ as well as a resilient compass point $q$ are mounted so as to be laterally displaceable on the slide bar $c$.

The slide gauge $f$ serves to determine the width of the characters and the slide gauge $e$ serves to determine the separation between characters.

The mode of utilization of the arrangement according to the present invention is as follows:

The width of the characters is read off at $f$. In order to determine the separation between characters, the character in question is adjusted at the top of the vertical slot $h$ by means of the slide gauge $e$ and the separation is read off in the slot adjacent the stationary alphabet $i$ in that the adjusted character is taken as that which follows one of the characters in the alphabet. As the slide gauges give the dimensions for characters 10 cm. high, the face of the character is computed on this basis. For a multiple of the basic height of 10 cm. the same multiple is taken of the width and separation and then the size is obtained which is required for the face of the character. An upper and lower line are now drawn to correspond to the height of the characters and the characters are then formed. In accordance with the height of the characters the thickness of the outline of the characters is adjusted on the slide bar $c$ in such manner that the two pencil holders $p$, $p'$ on one scale and the resilient compass point $q$ on the second scale are adjusted to the figures which correspond to the height of the selected characters. For example with characters 40 cm. high the pencil holders $p$, $p'$ are set to the number 40 on one scale and the resilient compass point $q$ is also set to the number 40 on the other scale, so that the appropriate thickness of outline is obtained.

By means of the handle $k$ the upper head board $a$ is held with its lower edge against the upper line, the pointer $m$ is set to the desired position on the protractor $d$ and then taking care that the pencils rest on the surface to be inscribed, the sliding bar $c$ is moved upwardly so that a double line is obtained for the stroke of an upright character. For oblique strokes of a character the same manipulation is employed after first setting the pointer $m$ to the line on the protractor $d$ which corresponds to the character which is to be drawn, the screw $l$ being released to permit this adjustment and then being tightened again.

For rounded and circular characters the bar $c$ alone is employed and the compass point $q$ adjusted to correspond with the drawing pencils is positioned at the centre of the character and the appropriate radius is struck above or below, to the right or to the left. By providing an extension on the scale $b$ letters of any desired height can be produced.

I claim:

1. In an arrangement for the regular formation of characters, taking particular account of the spacing of all characters, sizes and styles, comprising a head board, a protractor carried thereon, a graduated scale pivotally mounted on said head board and extending beyond one edge thereof, a pointer carried by said scale in position to indicate on said protractor the angular position of the scale, a slide bar slidable longitudinally of the graduated scale and provided with two scales, and pencil holders adjustable longitudinally of said bar.

2. In an arrangement for the regular formation of characters, taking particular account of the spacing of all characters, sizes and styles, comprising a protractor, a bar carrying a graduated scale pivotally mounted on said protractor and extending beyond one edge thereof, a pointer carried by said bar in position to indicate on said protractor the angular position of the bar, a cross bar slidable longitudinally of the graduated scale and provided with two scales, and pencil holders adjustable longitudinally of said cross bar.

3. In an arrangement according to claim 2, comprising a slidable shoe slidable on and removable from the first bar for carrying the cross bar.

4. In an arrangement according to claim 2, comprising a slidable shoe slidable on and removable from the first bar for carrying the cross bar and a clip at the lower end of the first bar to engage the slide shoe when the cross bar is not in use.

JOHANNA KAUFMANN.